Nov. 29, 1949 — W. M. ALLEN — 2,489,606
SPATULA
Filed Feb. 7, 1947
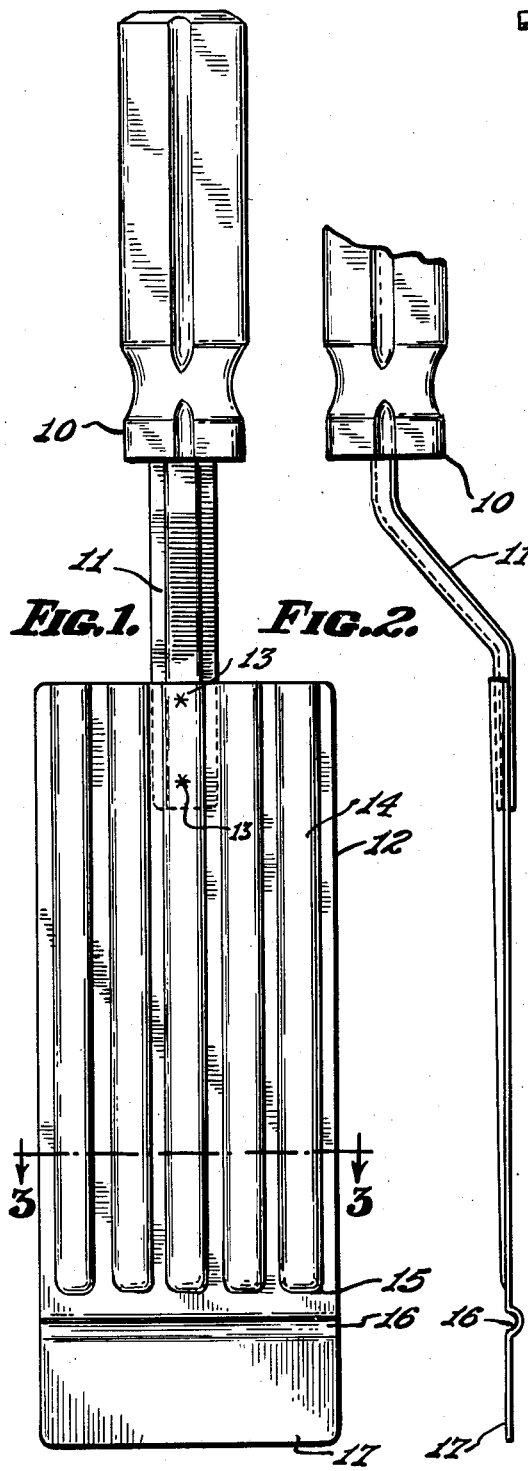
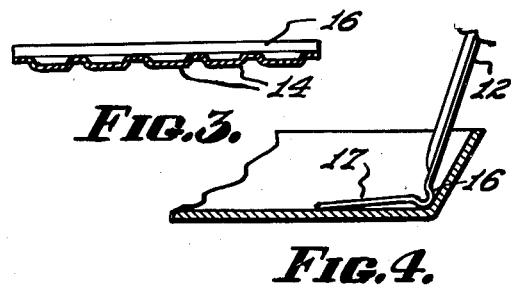
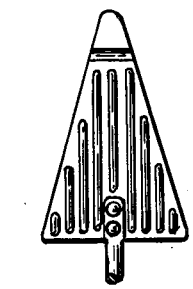
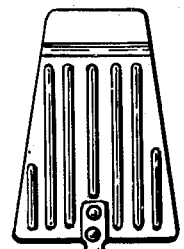
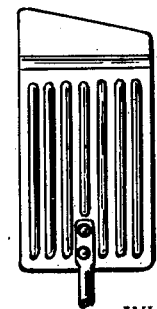
INVENTOR.
WILLIAM MERRILL ALLEN.
BY Allen & Allen
ATTORNEYS.

Patented Nov. 29, 1949

2,489,606

UNITED STATES PATENT OFFICE 2,489,606

SPATULA

William Merrill Allen, Glendale, Ohio, assignor to Model Crafters Inc., Hamilton, Ohio, a corporation of Ohio Application February 7, 1947, Serial No. 727,006

5 Claims. (Cl. 294—7)

This invention relates to a spatula such as is used in cooking for lifting material from a pan or for turning it over.

Spatulas, as they are known today, are usually relatively long, narrow pieces of springy steel having a relatively high degree of flexibility. The purpose of such structure is to render it easier to insert the spatula beneath the article without destroying the form of the article at the edge. For example, in turning over a fried egg, it is usually desired to do so without breaking the yolk. It has been found by a great many housewives that even with a spatula it is often difficult to turn over a fried egg or a similar article without breaking the yolk or tearing the edges of the white. The same situation obtains in removing slices of pie from a pie pan, and in other situations.

The reason for this difficulty I believe to be due to the fact that the spatula as a whole is flexible over its entire length to the same degree whereby it is substantially impossible to make the tip of the spatula bend more sharply than the major portion thereof.

With the above considerations in mind, it is an object of my invention to provide a spatula which is relatively inflexible over its major portion but which has a highly flexible tip portion, so that the tip portion may be slid down the side of a pan and may then bend abruptly along the bottom of the pan with the major portion of the spatula remaining stiff. I have found that a spatula as outlined above greatly facilitates numerous operations performed in the kitchen, such as the frying of eggs, the removal of pies from pie pans, and the like.

It is a further object of my invention to provide a spatula as outlined above which will be extremely inexpensive to manufacture and which will be sturdy enough to withstand all normal uses to which a spatula may be put.

These and other objects of my invention, which will become apparent as the description proceeds or which will be pointed out in more detail hereinafter, I accomplish by that certain construction and arrangement of parts, of which I shall now describe some exemplary embodiments.

Reference is made to the drawings forming a part hereof and in which:

Figure 1 is a plan view of a spatula according to my invention.

Figure 2 is a side elevational view thereof.

Figure 3 is a cross-sectional view taken on the line 3—3 of Figure 1.

Figure 4 is a fragmentary view similar to Figure 2 showing the spatula in use.

Figures 5, 6 and 7 are plan views to a reduced scale of some modified shapes in which my spatula may be provided.

Briefly in the practice of my invention, I provide a spatula having a major portion which is relatively inflexible and a tip portion which is highly flexible. The major portion and the tip portion are joined along a definite transverse boundary by a portion which is readily susceptible to transverse bending.

Referring now to the drawings, I have shown in Figure 1 a spatula having a handle 10 and a shank 11 to which the blade portion 12 of the spatula is fastened, as by spot welding at 13. This shank is ribbed as shown and fits into a central corrugation of the blade. The blade portion 12 is provided over a major portion of its length with longitudinal corrugations 14. It will be noted that the corrugations 14 extend from adjacent the handle end of the blade 12 to a transverse line spaced from the other end, as indicated at 15. Slightly spaced from the ends 15 of the corrugations 14, I provide a transverse corrugation or bead 16 beyond which there is the smooth or uncorrugated tip portion 17. The number of corrugations 14 will depend upon the width of the blade, but they should substantially cover the blade from side to side in order to produce a desired degree of stiffness.

The bead or corrugation 16 may be varied somewhat as to its dimensions, but I prefer to make it in the form of a semi-circular bead having a radius on the order of $\frac{3}{32}$-in. I have found that if the radius varies greatly from these dimensions, the spatula will not perform as satisfactorily. These dimensions are based upon the spatula blade being of a material of a thickness of about .010-in. If the thickness of the blade portion is changed then, of course, the radius of the bead 16 will have to be changed.

I have found that if the bead extends downwardly, or in other words, if on the upper face of the spatula, the bead is concave, the tip portion 17 may be bent to a right angle in use and will snap back to its original position immediately. It is therefore desired that the spatula in use be maintained with the concave side of the bead up, as most clearly shown in Figure 4. In order to insure that the spatula be used in this manner, the handle portion 11 may have an offset as clearly seen in Figure 2. The blade portion of the spatula may be given various forms, such as are shown in Figures 5, 6 and 7. In Figure 5 the shape is one which would be convenient for a pie or cake server; the shape of Figure 6 would have rather general utility, while that of Figure 7 would be particularly useful where a scraping or splicing action is desired, as where a pie crust is partially adhered to the pie pan. It will of course be understood that numerous shapes could be given to a spatula without departing from the spirit of the invention and without robbing it of its particular utility.

I have found that the blade portion may conveniently be made by stamping with dies and that this can be accomplished readily on stainless steel of about .010-in. in thickness which has been spring tempered without in any way destroying the spring temper. It would, of course, be possible to form the spatula blade and thereafter spring temper the finished blade.

Numerous modifications may, of course, be made without departing from the spirit of my invention, and I therefore do not intend to limit myself otherwise than as set forth in the claims which follow. Having now fully described my invention, what I claim as new and desire to secure by Letters Patent is:

1. A spatula comprising a relatively thin piece of springy steel, said spatula having over a portion of its length a plurality of longitudinal stiffening corrugations, and an uncorrugated tip portion, said portions being joined by a transverse corrugation susceptible to transverse flexing.

2. A spatula comprising a relatively thin piece of springy steel, said spatula having over a portion of its length a plurality of longitudinal stiffening corrugations, and an uncorrugated tip portion, said portions being joined by a transverse corrugation having substantially the form of a half-cylinder.

3. A spatula comprising a relatively thin piece of springy steel, said spatula having over a portion of its length a plurality of longitudinal stiffening corrugations, and an uncorrugated tip portion, said portions being joined by a transverse corrugation having substantially the form of a half-cylinder with its concave side upwardly disposed.

4. A spatula comprising a relatively thin piece of springy steel, said spatula having over a portion of its length a plurality of longitudinal stiffening corrugations, and an uncorrugated tip portion, said portions being joined by a transverse corrugation having substantially the form of a half-cylinder with its concave side upwardly disposed, said cylinder having a radius on the order of $\frac{3}{32}$ inch.

5. A spatula comprising a piece of springy steel of a thickness on the order of .010 inch, said spatula having over a portion of its length a plurality of longitudinal stiffening corrugations, and an uncorrugated tip portion, said portions being joined by a transverse corrugation having substantially the form of a half-cylinder with its concave side upwardly disposed, said cylinder having a radius on the order of $\frac{3}{32}$ inch.

WILLIAM MERRILL ALLEN.

REFERENCES CITED

The following references are of record in the file of this patent:

UNITED STATES PATENTS

| Number | Name | Date |
| --- | --- | --- |
| 1,723,507 | Haertter | Aug. 6, 1929 |
| 2,015,358 | Brokvist | Sept. 24, 1935 |
| 2,134,807 | Winger | Nov. 1, 1938 |